June 21, 1938. M. J. SASGEN ET AL 2,121,490
DOOR STOP
Filed March 10, 1937 2 Sheets-Sheet 1
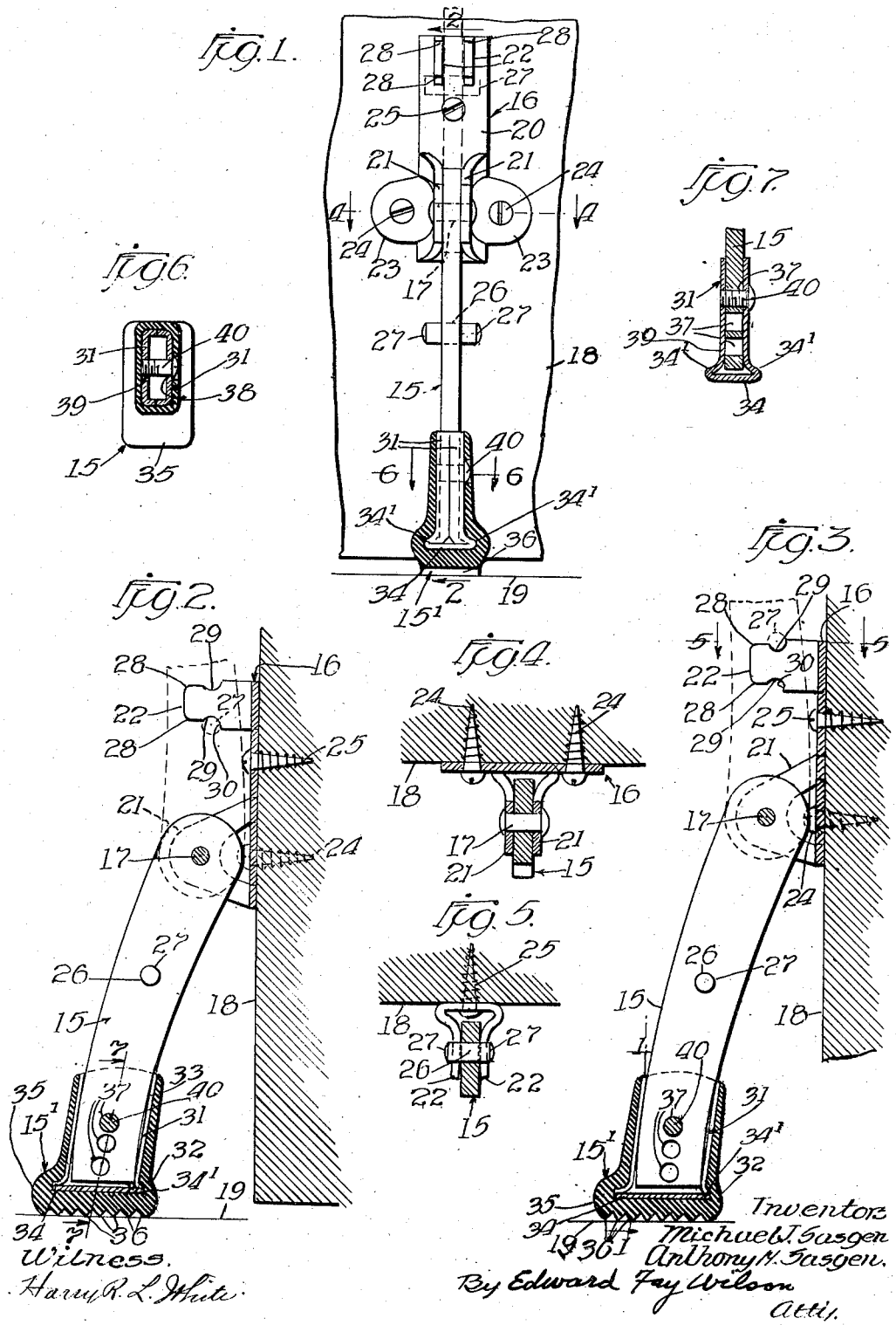

June 21, 1938. M. J. SASGEN ET AL 2,121,490
DOOR STOP
Filed March 10, 1937 2 Sheets-Sheet 2
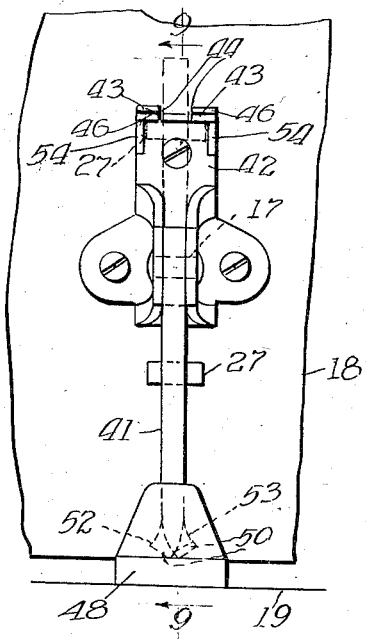
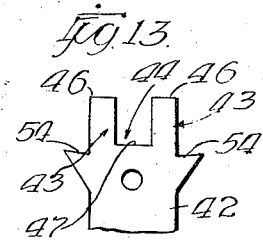
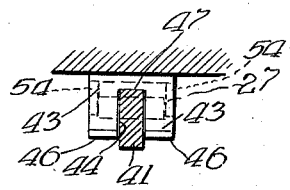
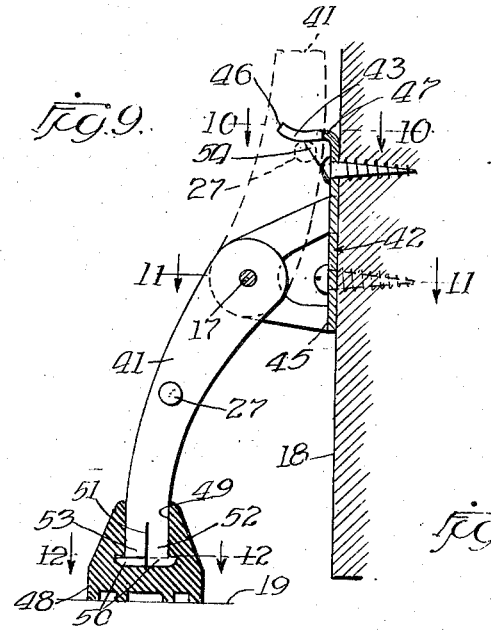
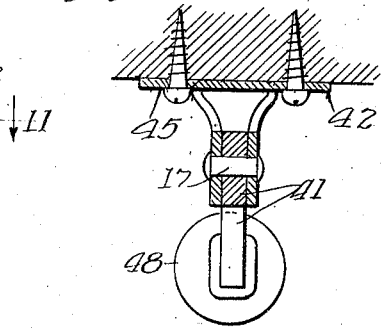
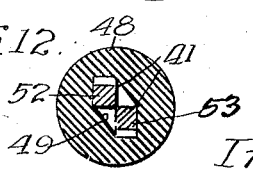

Patented June 21, 1938

2,121,490

UNITED STATES PATENT OFFICE 2,121,490

DOOR STOP

Michael J. Sasgen and Anthony M. Sasgen, Chicago, Ill., assignors to Grand Specialties Company, Chicago, Ill., a corporation of Illinois Application March 10, 1937, Serial No. 130,117

6 Claims. (Cl. 292—338)

This invention relates to improvements in door stops of the lever type and has special reference to improved means for yieldingly retaining the stop lever in raised inoperative position, novel means for readily changing the operative length of the stop lever, and simple means for removably retaining a slightly yielding shoe on the free end of the stop lever.

An important feature relates to means whereby one size of securing bracket can be used in connection with two different lengths of stop levers.

Other novel features of construction and operation will become apparent from the following description and accompanying drawings, taken in connection with the appended claims.

In said drawings:—

Fig. 1 is a front elevation of a stop lever embodying the invention in one form and shown partly in section on the line 1—1 of Fig. 3;

Fig. 2 is a vertical section substantially on the line 2—2 of Fig. 1;

Fig. 3 is a sectional view similar to Fig. 2 but showing a longer stop lever;

Fig. 4 is a horizontal section on the line 4—4 of Fig. 1;

Fig. 5 is a horizontal section on the line 5—5 of Fig. 3;

Fig. 6 is a horizontal section on the line 6—6 of Fig. 1;

Fig. 7 is a vertical section on the line 7—7 of Fig. 2, the rubber envelope not being shown;

Fig. 8 is a front elevational view similar to Fig. 1, but showing a slight modification of the invention;

Fig. 9 is a vertical sectional view on substantially the line 9—9 of Fig. 8;

Fig. 10 is a horizontal section on the line 10—10 of Fig. 9;

Fig. 11 is a horizontal section on the line 11—11 of Fig. 9;

Fig. 12 is a horizontal section on the line 12—12 of Fig. 9; and

Fig. 13 is a fragmentary front elevation of the base bracket before the projections are formed up.

The door stop of the invention comprises a stop lever 15, which is pivotally mounted at one end on a bracket 16, by a horizontal pivot 17 to swing up and down. The bracket 16 is adapted to be secured to the face of a door 18 at a suitable height so that when the stop lever 15 is dropped down, as shown in full lines in Fig. 2, its lower end or rather a shoe 15' will contact the floor 19 so that the lever will be positioned at such an inclination as to brace the door against swinging movement towards the lever.

The bracket 16 comprises an elongated base plate 20 provided with two parallel forwardly projecting ears 21 at its lower end between which the upper end of the lever 15 is received and it is pivotally retained in place by a pivot 17 which extends through said ears and the upper end of the lever.

At the upper end of the base 16 there are provided a pair of lever retaining projections 22. These projections 22, as shown, project out from the lateral edges of the base 16 and are separated enough and slightly flared outwardly, as best shown in Fig. 5, to permit the lever 15 to enter freely between them when the lever is swung up on its pivot 17, to inoperative position as shown in dotted lines in Figs. 1, 2 and 3.

The bracket 16 is also provided with securing ears 23, projecting out sideways from the lower end of the base and perforated to receive securing screws 24. The base 16 is also provided with a central hole near its upper end for receiving a third securing screw 25.

The lever 15 is a flat, relatively wide lever preferably formed out of sheet metal and is provided, between its ends, with a transversely disposed lifter pin 26 which projects out at each end to provide lateral projections 27 which can readily be engaged by the projecting edge of the sole of a shoe to assist in swinging the lever up from operative to inoperative position.

The projections 27 have the further function of engagement with the holding projections 22 for yieldingly retaining the stop lever 15 in its inoperative position.

The projections 22 are rounded on their outer corners 28 and are formed on their lower and upper edges to permit the stop pin 17 to be forced either under the projections as shown in Fig. 2 or over said projections as shown in Fig. 3 and into slight depressions 29.

The portions of said projections defining the inner or rear walls of said depressions 29, as shown at 30, are higher than the front ends of said projections and constitute stops to limit the movement of the stop lever 15 to a position free of the base 16 and in such position that the shoe 15' will be free of the door and in position to be engaged by the sole of the shoe of the operator when it is desired to free the lever from the holding projections 22, and preparatory to swinging the lever down to operative position.

As shown in Fig. 2, the retaining projections 27 are adapted to engage the lower edges of the projections 22 while in Fig. 5 there is illustrated a somewhat longer stop lever 15 and the retaining stops 27 on this longer lever are arranged to engage the upper edges of said projections 22. This construction permits the stops on the longer stop lever to be placed on the stop lever farther from the pivot pin 17 than on the shorter lever.

This difference in setting of the projections 27 is enough to set the projections, on the longer lever, somewhat further from the face of the door when the lever is in operative position, in which position the lifting projections can more readily be engaged for lifting the lever.

As explained, the lever 15 is preferably flat, and it is provided with a shoe 15' on its free end for contact with the floor. This shoe comprises an inner metal member 31 and an outer envelope 32, which is preferably made of semi-hard rubber vulcanized onto the inner metal member 31. The metal member 31 is formed with an elongated shank 33 which slidingly fits upon the free end of the lever 15. Preferably the inner metal member 31 has a flat bottom part 34 which extends forward, as shown, beyond the lever 15 to lengthen the bottom of the shoe and to provide a forwardly projecting toe on the shoe and it also extends transversely beyond the sides of the shank 33 as shown at 34'. Thus the bottom 34 provides a projecting flange or ledge to assist in retaining the rubber envelope 32 on the shoe. The inner metal member 31 is preferably formed up out of a flat elongated piece of sheet metal the transverse middle portion forming the bottom 34 and the two end portions formed into shallow channel shape which, when formed up into opposed relation, provide the hollow shank 33. The envelope 32 is thicker below the bottom 34 as shown at 35 and is preferably provided with transverse ribs 36 to assist in preventing the shoe slipping on the floor.

The lower end of the lever 15 is provided with a centrally arranged series of holes 37 and the shank is provided in its two lateral sides with holes 38 and 39, adapted to register with the holes 37 and to receive a removable holding screw 40 as best shown in Fig. 6. This is for the purpose of securing the shoe on the lever 15 in different relations for the purpose of changing the operative length of the lever. The screw 40 can be readily removed and the relative position of the shoe changed to lengthen or shorten the length of the lever and then the shoe clamped in its new position by the screw 40. The arrangement of the holes 37 on the lever 15 and the holes 38 and 39 in the shoe is such that when the shoe is arranged in position to make the lever of maximum length the upper-most hole 37 in the lever will not be exposed to view at the top of the shank 33. Such arrangement is more sightly than if any holes in the lever are exposed.

In Figs. 8 to 13 inclusive is shown a slight modification of the invention.

The device shown in Figs. 8 to 12 comprises a stop lever 41, mounted as before on a bracket 42 to swing up to inoperative position and down to operative position.

In this form of the invention the lever holding projections which retain the lever in inoperative position are somewhat different from the projections 22 already described. In this modified form, lever holding projections 43 are formed by forming a longitudinal slot 44 in the upper end of the base 43 of the bracket 42 and then bending the two projections 43, thus provided, to project forwardly of the base 45. The slot 44 is adapted to receive the lever 41, and the projections 43 are adapted to be contacted by the lifting projections 27 and by which engagement the lever 41 is yieldingly retained in non-operative position. The free ends 46 of the projections 43 are slightly curved upwardly, as shown to facilitate the positioning of the projections 27 below them. The slot 44 is of such depth that the bottom 47 of the slot serves as a stop to limit the up-swinging of the lever 41 and prevent the lever or its shoe contacting the door.

In this form of the invention we have shown a very simple means of retaining a rubber foot piece or envelope 48 on the free end of the lever.

As shown the foot piece 48 is circular in horizontal section and is made with a central hole 49 which extends from its top and downward into the body of the envelope but ends above the bottom surface thereof.

Such an envelope is adapted to be forced onto the free end of the lever and to assist in retaining it in position, the free end of the lever 41 is provided with relatively short projections 50 on its front and rear edges and it is split for a short distance by a central cut 51. The parts 52 and 53 of the free end of the lever formed by the cut 51, are then bent sideways in opposite directions, about the thickness of the lever, as best shown in Fig. 12. This formation serves to hold the envelope 48 on the lever, once the lever has been inserted into the central hole in the envelope, as the wall of the envelope is stretched tightly around the free end of the lever and the lever has not only the front and rear projections 50 but also the sidewise projecting end portions 52 and 53.

To brace up the projections 46 and prevent them from being accidently bent down by the one operating the device there are small braces 54 provided. These braces comprise small triangular shaped projections formed extending out from the edges of the base plate 45, as best shown in Fig. 13, and then, in completing the bracket 42, they are bent forwardly into parallel relation and in position to lie beneath the outer edge portions of the projections 46.

As many modifications of the invention will readily suggest themselves to one skilled in the art we do not limit or confine the invention to the specific details of construction herein shown and described except within the scope of the appended claims.

We claim:—

1. In a door stop of the kind described, a stop lever, a base upon which the lever is pivotally mounted at one end to swing up and down, the upper end of the base divided by a slot to provide two holding projections, the projections being bent to project forwardly, the lever provided, between its ends, with laterally extending lifting projections and said lifting projections arranged to frictionally engage said holding projections to retain the lever in raised non-operative position.

2. The invention as defined in claim 1, said holding projections being slightly vertically yielding for frictionally engaging the lifting projections.

3. The invention as defined in claim 1 and means on the base arranged and adapted to prevent said holding projections being bent down in use.

4. The invention as defined in claim 1, and braces arranged beneath said holding projections.

5. The invention as defined in claim 1 and integral braces projecting beneath the edge portions of said holding projections, said integral braces being formed inwardly from the lateral edges of the base.

6. In a door stop of the kind described, a stop lever, a base upon which the lever is pivotally mounted at one end to swing up and down, a member resiliently mounted on the base adjacent its upper end, said member being slotted to provide holding projections, the projections projecting forwardly, and the lever being provided, between its ends, with laterally extending lifting projections arranged to frictionally engage said holding projections to retain the lever in raised non-operative position.

MICHAEL J. SASGEN.
ANTHONY M. SASGEN.